May 3, 1960   L. ARNETT ET AL   2,935,010
BEVERAGE BREWING AND DISPENSING APPARATUS
Filed Oct. 13, 1955   6 Sheets-Sheet 1
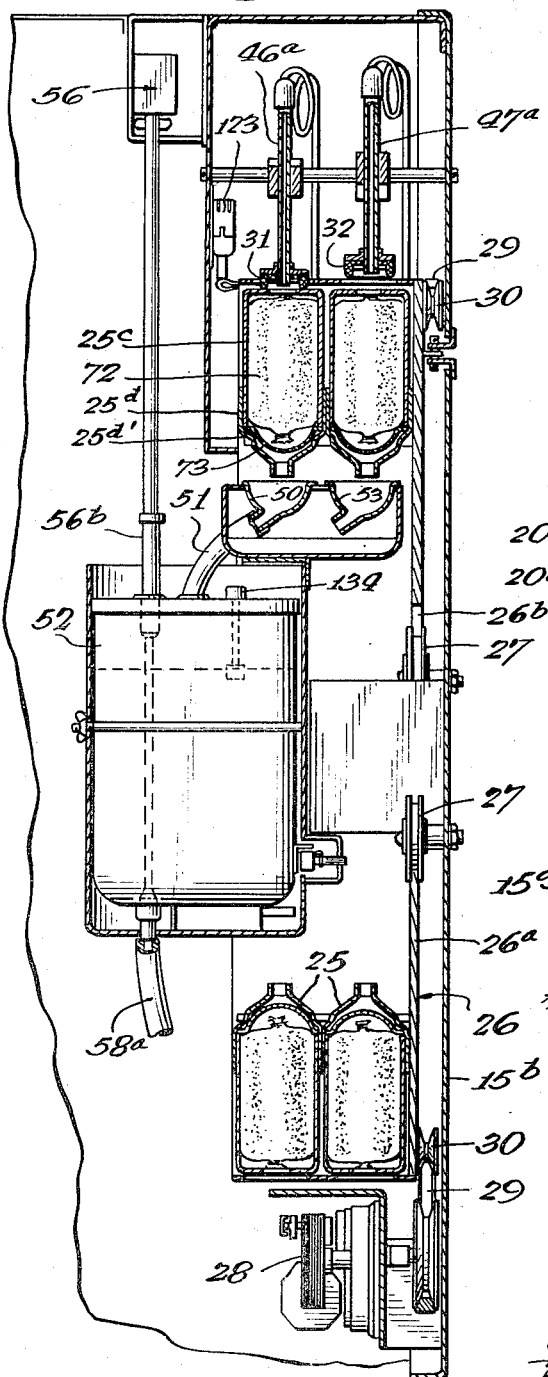
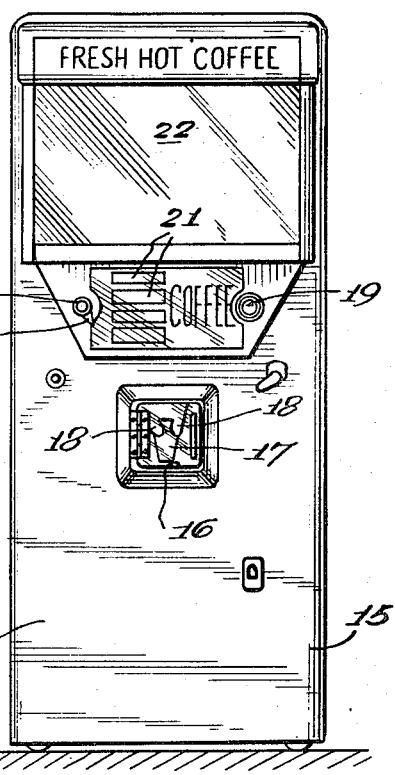
Inventors
Leslie Arnett
William G. Freise
By Schroeder, Hofgren, Brady & Wagner
Attorneys

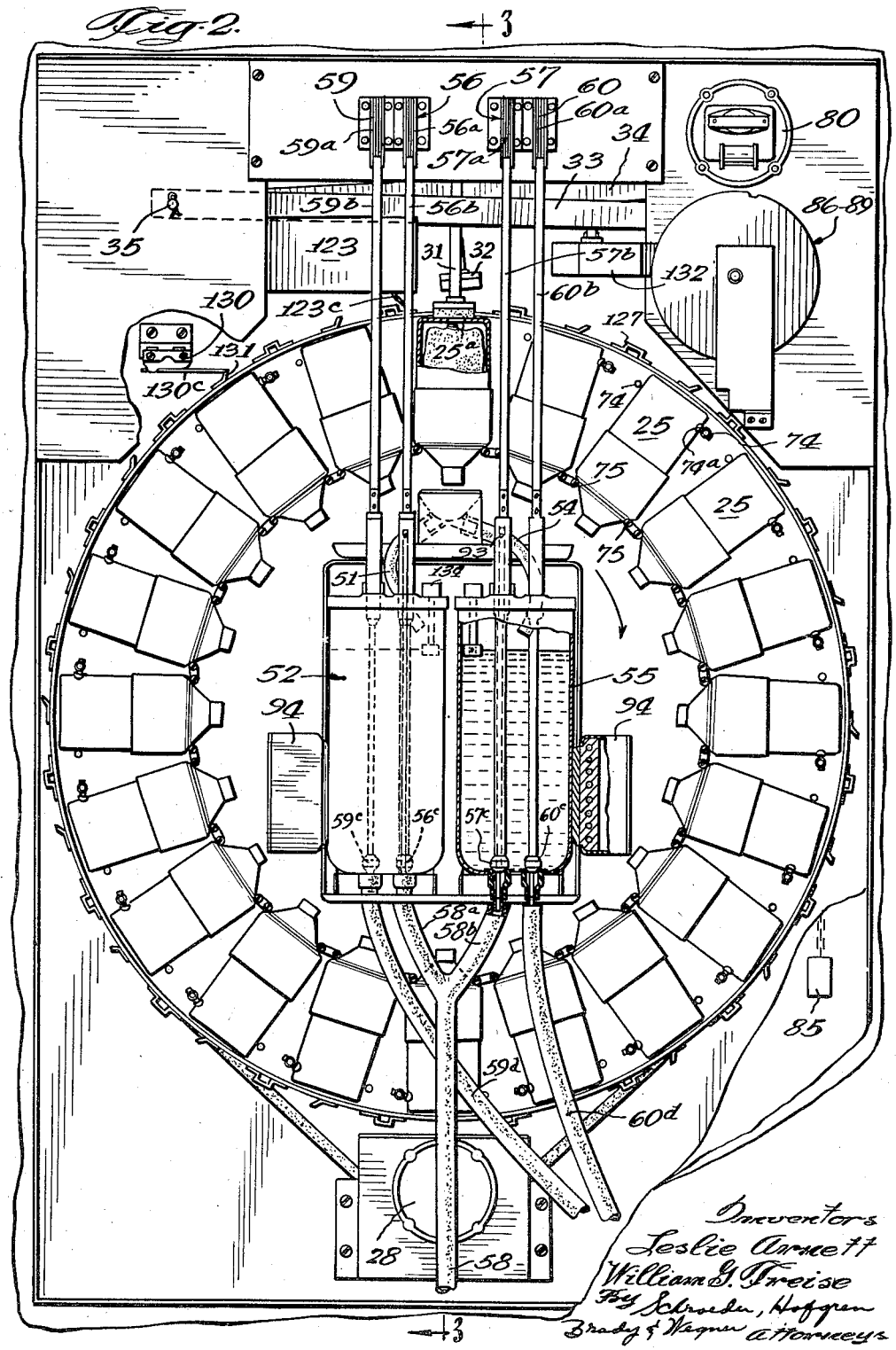

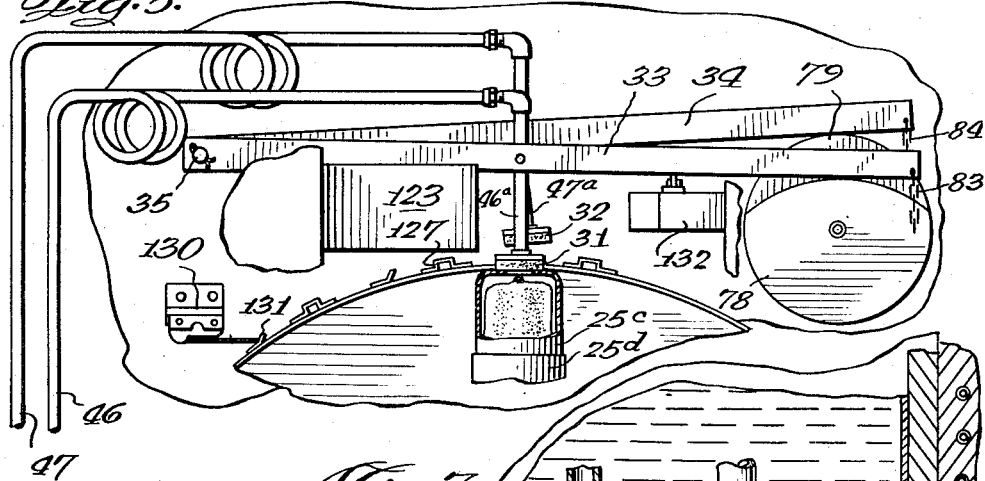
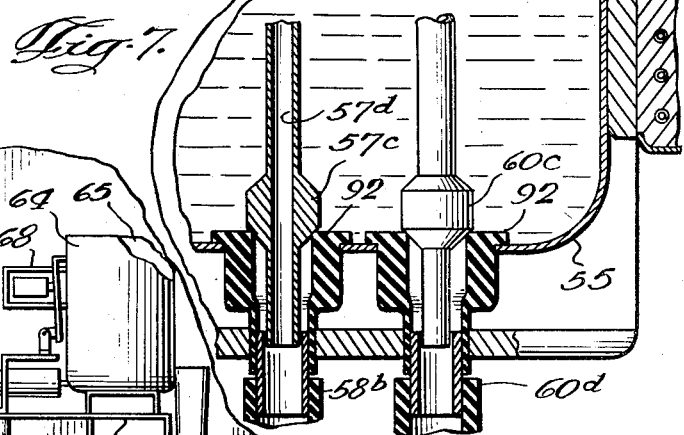
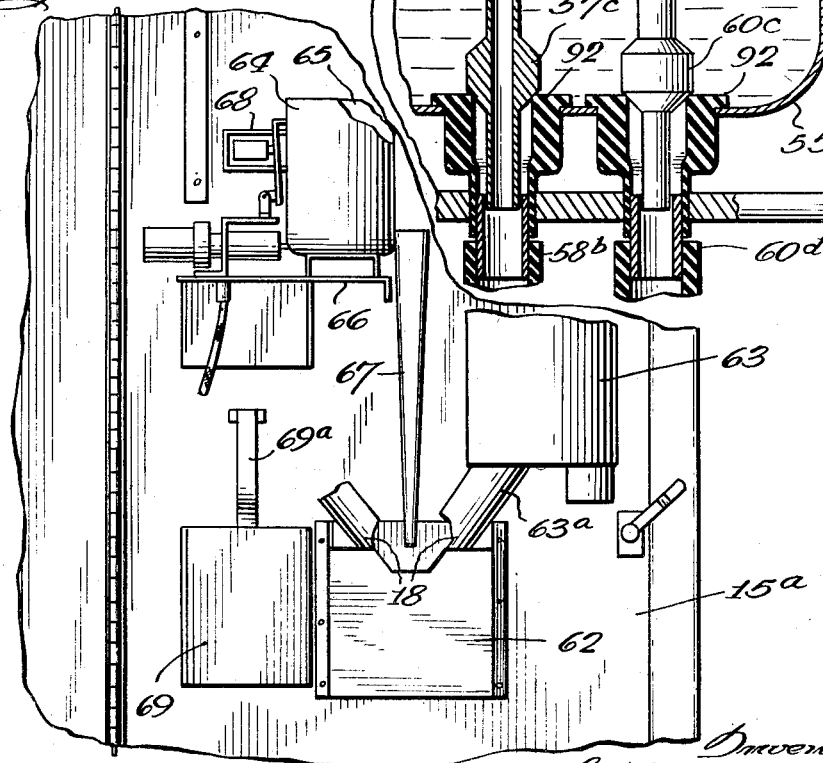

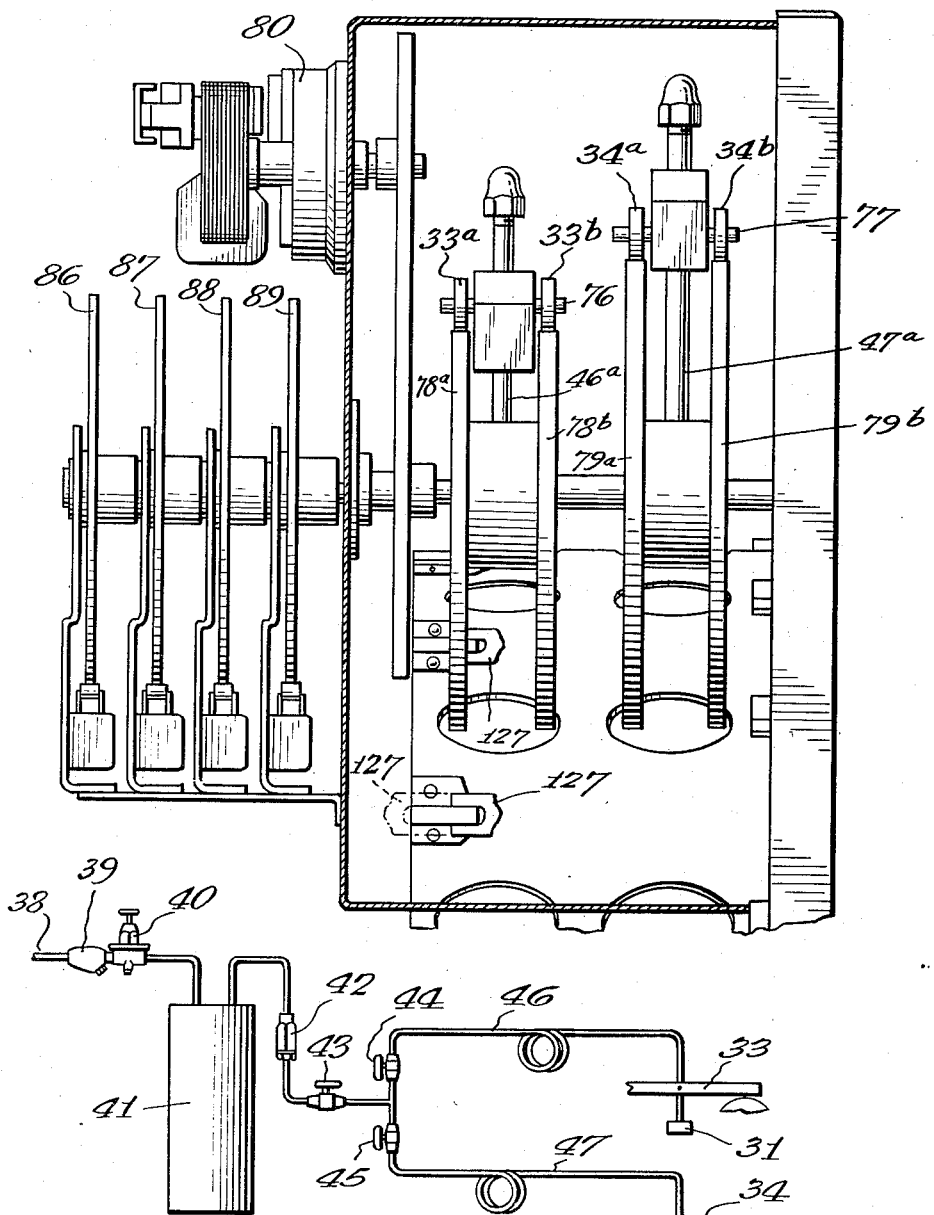

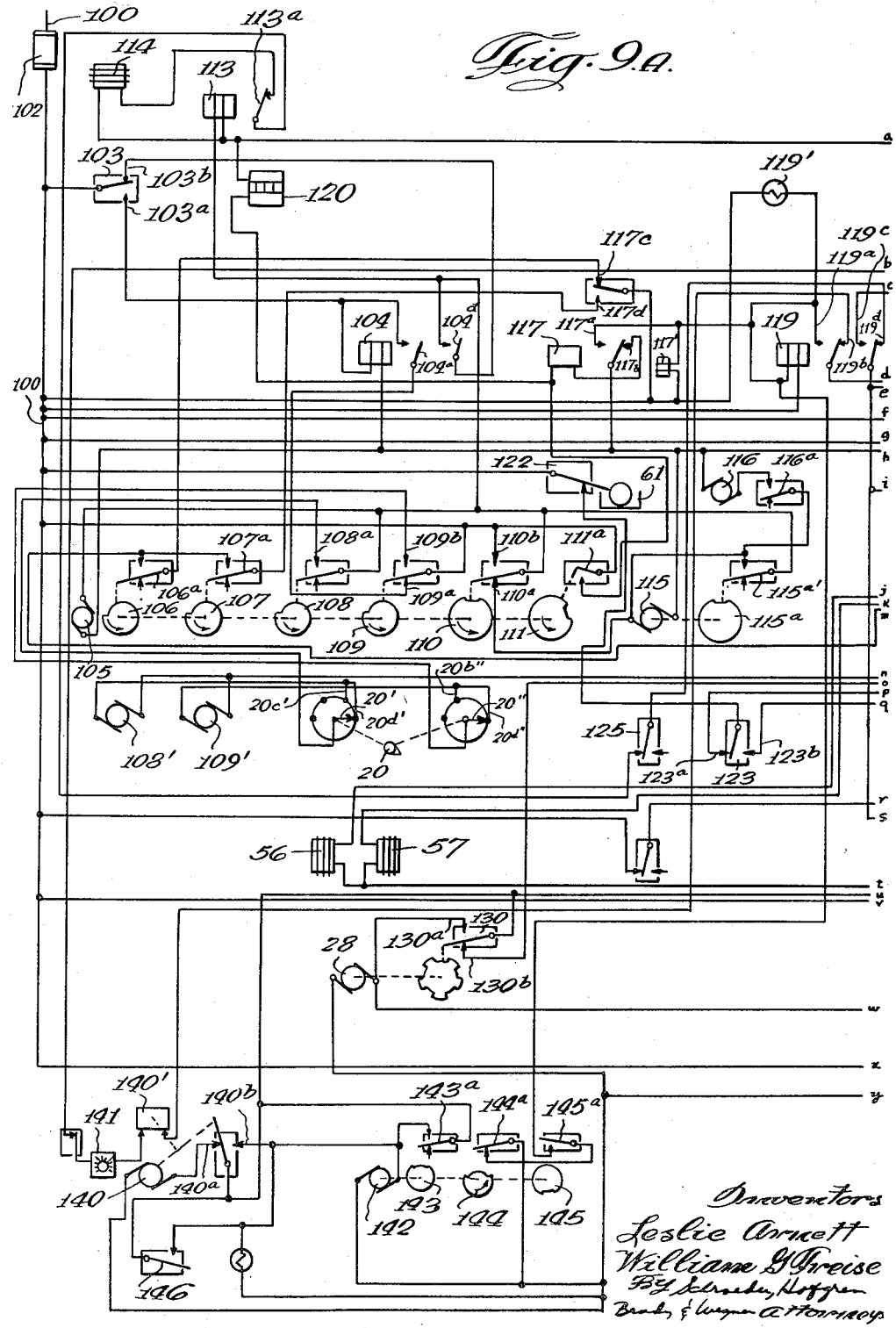

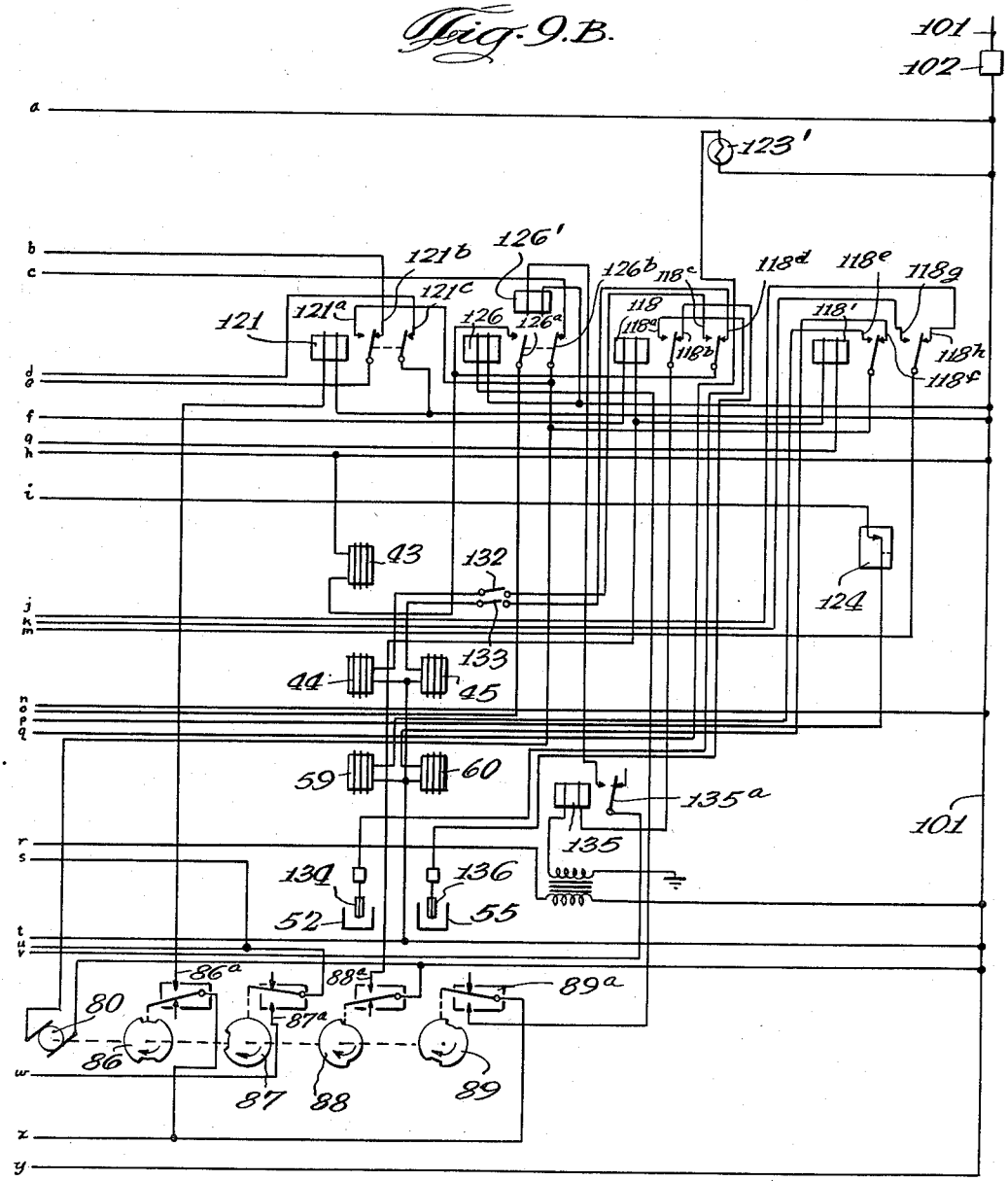

United States Patent Office 2,935,010
Patented May 3, 1960

2,935,010

BEVERAGE BREWING AND DISPENSING APPARATUS

Leslie Arnett and William G. Freise, Chicago, Ill., assignors to United Coffee Corp., a corporation of Illinois Application October 13, 1955, Serial No. 540,252

16 Claims. (Cl. 99—283)

This invention is concerned with a beverage brewing and dispensing apparatus and more particularly with a new and improved apparatus for preparing and dispensing coffee.

Many types of beverage dispensing apparatus are in wide use, being found in rail, bus and air terminals, manufacturing plants and other locations where large numbers of people are likely to gather. The present invention is concerned particularly with coffee brewing and dispensing apparatus which prepares coffee directly from the coffee bean, rather than from powdered coffee, and which is an improvement over the machine shown in copending Arnett application, Serial No. 336,563, filed February 12, 1953, now Patent 2,761,200, issued September 4, 1956.

One feature of the present invention is that the percolators in which the coffee is prepared are not permanently affixed in the machine and may readily be changed. This is accomplished by providing an apparatus including a plurality of brewing receptacles, a source of brewing liquid under pressure, and means for causing relative movement between said receptacle and said source for making a sealed connection successively with the receptacles for introducing liquid thereto, to brew a fresh beverage.

Another feature is that a pair of beverage storage containers are provided, with means for automatically providing freshly prepared beverage for each of the containers and means for dispensing beverage from one of the containers while replenishing the supply of beverage in the other.

A further feature is that the apparatus includes a rotatable support member, a plurality of brewing receptacles carried by the support member, a source of brewing liquid under pressure and including a pressure connector, a brewing station adjacent the pressure connector, means for rotating the support member to bring the receptacles sequentially into the brewing station and means for bringing the pressure connector into sealed engagement with receptacles positioned at the brewing station to introduce brewing liquid thereto. Still another feature is that the movement of the pressure connector into engagement with the receptacles is effected by a motor and cam control.

Still another feature is that the apparatus includes a pair of storage containers, means for providing fresh beverage for the containers, means for dispensing beverage from the containers, a first circuit for controlling the provision of fresh beverage to one of the containers and for controlling the dispensing of beverage from the other container, a second circuit for controlling the provision of fresh beverage to the other container and for controlling the dispensing of beverage from the other container, and means for alternately energizing the first and second circuits.

Yet a further feature is that the apparatus includes means for preparing fresh beverage, a container adapted to receive beverage from the preparing means, means for dispensing beverage from the container, a totalizer actuated by each operation of the dispensing means, and means actuated by the totalizer for causing operation of the beverage preparing means after a predetermined number of operations of the dispensing means.

Another feature is the provision of a storage container for beverage to be dispensed, means, including a valve for dispensing beverage from the container, a timer for controlling operation of the valve, and means for varying the period of time the valve is open as a function of the quantity of beverage in the container.

A further feature is the provision of an apparatus including means for preparing fresh beverage, a pair of beverage containers, means for dispensing beverage from each of the containers, means for causing the preparation of fresh beverage when the supply in the containers is depleted, and means for causing the preparation of fresh beverage when it has not been prepared for a predetermined period of time, including means for emptying one of the containers, time delay means and means responsive to the time delay means for emptying the other of the containers.

Still another feature is the provision of a beverage handling system including means for storing a beverage, means for dispensing beverage from the storage means, means for repeatedly supplying fresh beverage to the storage means as needed, first timing means, means operable as a function of said first timing means to cause said system to supply fresh beverage; and second timing means for disabling the first timing means. And a further feature is the provision in a beverage preparing machine of apparatus comprising a plurality of percolators, a movable mounting member carrying the percolators, and clip means securing the percolators on the mounting member and permitting ready removal and replacement thereof.

Further features and advantages will readily be apparent from the following specification and from the drawings, in which:

Figure 1 is a front elevational view of a beverage preparing and dispensing machine embodying the present invention;

Figure 2 is an elevational view of the interior of the apparatus with various portions broken away showing details thereof;

Figure 3 is a vertical sectional view taken substantially along line 3—3 of Figure 2;

Figure 4 is a fragmentary elevational view of the rear of the door of the apparatus;

Figure 5 is a fragmentary detail view of the operation of the pressure arms;

Figure 6 is a fragmentary side elevational view of the upper portion of Figure 2, looking from the right;

Figure 7 is an enlarged fragmentary sectional view of the outlet valves for the beverage containers;

Figure 8 is a diagrammatic flow sheet for the apparatus; and

Figure 9 (comprising portions 9a and 9b) is a schematic diagram of the electrical control circuit for the apparatus.

Coin-operated beverage dispensing machines are normally placed in locations which may be widely separated although there may be several at each site. In most instances, the machines are serviced by men who maintain a large number of machines in different places. The brewing receptacles or percolators which have been used are removed from the machine by the serviceman, replaced with clean, freshly charged percolators and the used units taken to a central kitchen for washing, sterilizing and refilling. It is desirable therefore that the percolators be readily accessible within the machine and be easily removable therefrom to facilitate the work of the serviceman, permitting him to maintain a larger number of machines.

Turning now to Figure 1 of the drawings, a beverage dispensing machine is shown housed in a cabinet 15 having a front door 15a which may be opened to provide access to the interior of the cabinet. A service opening 16 is centrally located in the door 15a permitting the customer to remove a cup 17 which is supported by fingers 18 during filling with the desired beverage. Selection of the desired beverage, as black coffee, coffee with cream and sugar, or the like, may be effected by manipulation of a selector dial 20 which includes a pointer 20a indicating the desired drink on panels 21. The operation of the machine is initiated by the insertion of an appropriate coin into a slot 19 provided in the door. The panel 22 on the upper portion of the door may carry a suitable advertising display.

Turning now to Figures 2 and 3, the interior arrangement of the machine is shown. A plurality of percolators 25 are carried in a double row on a wheel 26. The back plate 26a of the wheel has a central opening 26b therein by means of which it is rotatably mounted on sheaves 27 (there being three, only two of which are shown in Figure 3) pivotally mounted on the rear wall 15b of the cabinet. A motor 28, sometimes referred to as the wheel drive or magazine motor, effects the desired rotation of wheel 26 through a belt 29 which passes over a plurality of pulleys 30 mounted on the rear of plate 26a, to position the various percolators successively at a brewing station at the top of the machine.

A pair of pressure connectors 31 and 32 are provided adjacent the brewing station, connector 31 being carried by pressure arm 33 and connector 32 being carried by arm 34, both of which are pivotally mounted at one end about a pin 35. As will appear more fully later, the pressure connectors 31 and 32 are alternately brought into contact with the inlet opening 25a in the end of the associated percolator receptacle. The percolator engaging surfaces of the connectors are of a resilient material to insure a good seal.

Water enters the machine from a suitable source, as a pressurized water main, through an inlet pipe 38 (Figure 8), passing through a strainer 39 and pressure reducing valve 40 to a hot water heater 41. Hot water from the heater 41 passes through a flow regulator 42 and an electrically operated safety valve 43 to a pair of percolator valves 44 and 45 in conduits 46 and 47 leading to pressure connectors 31 and 32, respectively. When one of the connectors is in sealed contact with a percolator, the appropriate valves may be opened, as will appear later, to admit hot water under pressure to the percolator in which the desired beverage is brewed, the resulting infusion flowing, if from the outer row of containers, through a funnel 50 and connector hose 51 to a storage container 52 from which it may be dispensed. If connector 32 is utilized, together with one of the percolators in the rear row, the resulting infusion flows through funnel 53 and hose 54 to receptacle 55. Coffee may be dispensed from the containers by actuation of electrically operated dispensing valves 56 or 57 in containers 52 and 55, respectively, the dispensed coffee flowing through hoses 58a and 58b to a common dispensing hose 58 which has an outlet (not shown) positioned adjacent fingers 18 to deliver the beverage to the cup 17 positioned in the access opening.

The valves 59 and 60 in containers 52 and 55, respectively, are provided for draining the remaining coffee therefrom prior to the preparation of a fresh supply, as will appear, this coffee draining through hoses 59d and 60d to a waste tank 61 (Figure 9a).

Carried on the inside of the door 15a of the cabinet is a box-like structure 62 which encloses the service opening 16 and within which the cup supporting fingers 18 are located. A cup dispenser 63 of any suitable design is mounted above the service opening, cups dispensed therefrom sliding down an inclined chute 63a to the supporting fingers. Containers 64 and 65 are mounted side-by-side on a platform 66 carried by the door and above the service opening. These two containers hold supplies of powdered beverage ingredients, as powdered sugar and powdered cream, which may be dispensed therefrom to fall through a funnel 67 into the cup 17 as desired. An agitator mechanism 68 jars the ingredient containers periodically preventing caking of the cream and sugar. Further details of the powdered ingredient dispensing mechanism may be found in copending Arnett application, Serial No. 482,164, filed January 17, 1955, now abandoned. The agitating mechanism is shown in detail in copending Arnett and Freise application, Serial No. 504,491, filed April 28, 1955, now Patent No. 2,798,643, issued July 9, 1957. Also mounted on the inside of door 15a is a coin box 69, the coins inserted into slot 19 passing through coin guide 69a into the coin box.

The percolators 25 are formed of two readily separable sections 25c and 25d. The section 25c is an elongated, cylindrical element which is telescopically received in the mouth of cup-shaped element 25d. The ground coffee bean used in preparing fresh coffee is contained in bag 72 of filter paper which is inserted within percolator section 25c. A perforate metal plate 73 provides a support for the bag during brewing. When hot water under pressure is admitted to the percolator during the brewing operation, the bagged coffee is forced downwardly and outwardly against the walls of the percolator. This maintains the pressure of the hot water within the percolator and insures that the water will contact all the ground coffee. Further details of the construction of the percolator, the bagged coffee and the support plate may be found in copending Arnett and Freise application, Serial No. 507,688, filed May 11, 1955.

The percolators 25 are supported in pairs by pins 74 and 75 extending forwardly from the rear plate 26a of the wheel. The pins 74, there being two for each pair of percolators, engage opposite sides of percolator element 25c while the two pins 75 associated with each pair of percolators engage the shoulder 25d' of cup-shaped percolator element 25d, preventing longitudinal movement of the percolator. A spring clip 74a carried by one of the pins 74 holds the percolators securely on the wheel, yet permits them to be removed and replaced easily by the serviceman.

Referring now more particularly to Figures 5 and 6, it will be seen that the pressure arms 33 and 34 each comprise a pair of arm members 33a, 33b, 34a and 34b. The pressure connectors 31 and 32 are carried on extensions 46a and 47a of hot water lines 46 and 47, which are in turn mounted on pins 76 and 77 extending between the arm members 33a and 33b, and 34a and 34b, respectively. The arms 33 and 34 extend across the top of the machine from pivot pin 35 to pressure arm cams 78 and 79, each of the cams comprising two cam portions 78a and 78b, 79a and 79b supporting the two members of the arms 33 and 34. The cams are driven, through suitable gearing, by pressure arm motor 80 to raise and lower the pressure connectors 31 and 32, alternately, as desired. Attached to the ends of pressure arms 33 and 34 are chains 83 and 84 which support weights, as 85. While only one weight is shown (Figure 2) it will be understood that a weight is provided for each of the arms. These weights insure that the pressure connectors will be brought into engagement with the percolators 25 with sufficient force to provide an adequate seal. In a machine that brews coffee at ten pounds per square inch water pressure, it has been found satisfactory to seal the connectors with a pressure of 20-25 pounds per square inch.

Four additional cams 86, 87, 88 and 89 are driven by pressure arm motor 80 and operate switches which form a part of the electrical control circuit and will be described in more detail later.

The dispensing valves 56 and 57 and the dumping valves 59 and 60 are electrically operated by solenoids 56a, 57a, 59a and 60a, respectively. Attached to the armatures of the solenoids are valve stems 56b, 57b, 59b and 60b which extend downwardly into the respective dispensing containers 52 and 55 and which carry at their lower ends valve members 56c, 57c, 59c and 60c. Shown more clearly in Figure 7, the valve members seat in rubber fittings 92 which extend through openings in the bottom of the dispensing container and to which the conduits 58b and 60d are attached. The stem 57b of the dispensing valve is open forming a vent passageway 57d which is open to air through a transverse opening 93 in the valve stem and above the top of the dispensing container. This passageway vents the interior of dispensing conduit 58 to atmosphere when the dispensing valve is closed so that coffee is not permitted to stand therein and become cold between servings. This valve is described in more detail in copending Arnett and Freise application, Serial No. 546,977, filed November 15, 1955. The coffee in tanks 52 and 55 is kept at the desired serving temperature by means of electrical heaters 94 held in heat conductive contact with the sides of the containers.

Turning now to Figure 9, comprising portions 9a and 9b, the electrical control circuit and operation of the machine will be described in detail. The two portions of the circuit are drawn to fit together when placed side-by-side and connecting lines are indicated by lower case letters a–y.

The machine is energized from a suitable source of electrical power as 110 volts A.C., through leads 100 and 101, and is protected against overload by fuses 102.

Assuming that both dispensing containers 52 and 55 are filled with coffee, the dispensing cycle of the machine will be described. When a suitable coin is inserted in the coin slot 19 it actuates double-throw coin switch 103 closing contact 103a thereof and connecting coin relay 104 across the line through lead h. On energization of relay 104, contacts 104a and 104b associated therewith are closed. Contact 104a is in a holding circuit for relay 104, which circuit is completed to line 100 through contact 109a of a cam-operated switch which will be described more fully later. As soon as the coin passes coin switch 103, the switch returns to the position shown in the drawing closing contact 103b completing a circuit from line 100 through coin relay switch 104b energizing dispensing timer motor 105. At the same time, coin reject relay 113 is energized opening switch 113a and breaking the energization circuit for coin reject magnet 114, preventing the insertion of another coin during the dispensing cycle.

Timer motor 105 drives six cams, 106, 107, 108, 109, 110 and 111 which cause the operation of the proper elements of the system to dispense the desired beverage. Cup dispensing motor 115 is energized through contact 104b and contact 110a associated with cycle cam 110. As timer motor 105 begins to turn, contact 110a is opened and contact 110b closed completing a circuit through from line 100 to dispensing timer motor 105. Before contact 110a is opened, the cup motor has had time to drive cam 115a associated therewith closing switch 115a' completing a secondary energization circuit for the cup motor. The initial operation of cup motor 115 causes a cup 17 to be separated from the cup supply and positioned in the access opening 16 for filling. At the end of the cycle of cup motor 115, cam switch 115a' opens breaking the motor energization circuit.

Cup magazine switch 116a closes when a stack of cups is depleted, energizing magazine motor 116 to bring a fresh stack into dispensing position.

The cams 106, 107, 108 and 109 and their associated switches are preferably of an adjustable type such as that shown in Arnett and Freise application, Serial No. 487,834, filed February 14, 1955, now abandoned, in which the switches may readily be adjusted to close at any desired point in the cycle, so that the desired quantity of each of the beverage ingredients is dispensed. Two coffee cams 106 and 107 are provided and the switches 106a, 107a associated therewith close at slightly different times for reasons which will be discussed fully later. For present purposes, it is sufficient to consider that switch 106a is connected to the line 100 through switch 117c. When switch 106a closes line m is energized and a circuit is completed through contact 118h and line j, opening coffee dispensing valve 56 for the desired period of time. Similarly, as dispensing timer motor 105 continues to operate switches 108a and 109b are closed causing operation of cream and sugar motors 108' and 109' respectively, assuming that the selector 20 is in the position (coffee with cream and sugar) shown in the drawing, closing contacts 20d' and 20d'' of switches 20' and 20''. If selector 20 is adjusted by the user to indicate black coffee, switches 20' and 20'' are left open and the closing of switches 108a and 109b has no effect. Similarly, contacts 20c' or 20b'', respectively, are closed when the customer selects coffee with cream or coffee with sugar.

When switch 109b is closed, contact 109a is opened, breaking the holding circuit for relay 104 permitting contacts 104a and 104b to open, readying this portion of the circuit for the next cycle. However, coin reject relay 113 remains energized through switch 110b, preventing the insertion of a coin during the dispensing cycle. Immediately prior to the end of the dispensing cycle, switch 111a is closed momentarily effecting momentary energization of totalizer relay 117 and counter mechanism 120. At the end of the dispensing cycle, switch 110b opens and 110a closes once again readying the dispensing circuit for operation, breaking the energization circuit for coin reject relay 113 permitting contact 113a to close and again energizing coin reject magnet 114.

Totalizer relay 117 registers the number of cups of coffee dispensed and, after the dispensing container is half empty (eight cups with the machine being described) opens switch 117c and closes switch 117d changing the coffee timing from cam 106 to cam 107 which is adjusted to keep the coffee dispensing valve open a slightly greater length of time than cam 106. This insures that the quantity of coffee delivered in each serving is substantially the same although the head of coffee in the dispensing system changes as the level of coffee drops in the dispensing container.

After fifteen cups of coffee have been dispensed totalizer relay 117 closes contact 117a and opens contact 117b. Contact 117a completes the energization circuit from line 100 to relay 119 closing contacts 119a and 119c while opening contacts 119b and 119d. A secondary energization circuit for relay 119 is completed through contact 119a, line d, and contact 121c associated with pressure arm relay 121. At the same time, step relay release coil 117' is energized releasing the switches associated with relay 117 so that they return to the positions shown in the drawing, readying the totalizing circuit for dispensing the next fifteen cups of coffee. The opening of contact 119d breaks the energization circuit for coin reject magnet 114 which is normally energized from a "safety" power circuit which may be traced from one side of the line 100 through overflow cutout switch 122, percolator empty switch contact 123a, wire p, manual shut-off switch 124, wire i, contact 119d, cup empty switch 125 and coin reject relay switch 113a. The closing of contact 119c completes a circuit from the safety power lead i through lead c, contact 126b of percolator relay 126, energizing pressure arm motor 80. A light 119' is connected in parallel with relay 119, indicating to the customer that the machine is temporarily not dispensing.

As motor 80 starts to turn, it drives pressure arm cams 78 and 79 raising the pressure connector from the percolator last used and lowering the other pressure connector toward the percolator to be next used. In the circuit with the various cams and switches as shown in Figure 9, the machine has last brewed in the rear row of percolators, and the percolator pressure arms at the start of the brewing cycle are in the positions reversed from that shown in Figures 2, 3, 5 and 6. Accordingly, under the operation of pressure arm motor 80, pressure arm 34 is lifted and arm 33 is lowered. The initial movement of the switch cams associated with motor 80 closes contact 86a completing a circuit through lead x energizing pressure arm relay 121; and also closes switch 88a energizing selector relays 118 and 118' which are connected in parallel.

On energization of pressure arm relay 121 contact 121a closes and contacts 121b and 121c open. Contact 121a completes two circuits, the first being a secondary energization circuit for pressure arm motor 80 and the second, through contact 118e, energizing the dumping valve 59 emptying any coffee remaining in tank 52. This is done to prevent mixing fresh coffee with that which may have been standing in the dispensing tank for several hours. The opening of contact 121c breaks the holding circuit for relay 119 permitting its contacts to return to the positions shown in the drawing, closing contacts 119b and 119d. The latter contact, 119d, completes the energization circuit for coin reject magnet 114 returning the dispensing portion of the machine to normal operation.

When the pressure arm motor 80 is about half way through its cycle, that is when both of the pressure connectors 31 and 32 are raised above the wheel 26, switch 87a, associated with cam 87, closes, completing an energization circuit for wheel drive motor 28 which turns the wheel bringing the next pair of percolators 25 into the brewing position. Switch 87a is closed only momentarily and the initial movement of the wheel causes the operation of double-throw switch 130, closing contact 130a completing a secondary energization circuit for motor 28. Switch 130, see Figure 2, has an operating arm 130c which engages a series of lugs 131 carried on the outside of the flange 26c of the wheel. When the wheel has reached the proper position, with the next pair of percolators in the brewing position, switch operating arm 130c is engaged by a lug 131, opening contact 130a and closing contact 130b. The wheel is shown diagrammatically in the schematic drawing as having five stop positions, but it is to be understood that in the physical embodiment of Figure 2 there are twenty such positions. It will be seen from an examination of cam 87 that switch 87a closes only on every other brewing cycle.

After the wheel 26 has turned and just before switch 86a opens terminating the cycle of pressure arm motor 80, switch 89a associated with cam 89 closes momentarily energizing percolator relay 126, which locks in the energized position. Contact 126a associated with the percolator relay closes, completing the energization circuit for water safety valve 43; this circuit may be traced from the "safety" power line through wire s, wire u, switch 130b (if wheel 26 is not in proper position, the circuit is not completed), wire o and contact 126a. At the same time a circuit is completed through contact 118c of the selector relay and safety switch 132 energizing percolator water valve 44. Safety switch 132 is disposed beneath pressure arm 33 (Figure 2) so that only when the arm is in the proper position, and thus pressure connector 31 properly seated, is water permitted to flow. A similar switch 133 is associated with pressure arm 34.

Hot water then flows through conduit 46 into the percolator and the resulting coffee infusion drains through funnel 50 and hose 51 into container 52. When the level of coffee in the tank reaches electrode 134, a circuit is completed through contact 118a of the selector relay, energizing high voltage "brewing stop" relay 135. This in turn closes contact 135a completing an energization circuit through wire v for percolator relay release coil 126'. Contacts 126a return to the position shown in the drawing breaking the energization circuit for water safety valve 43 and percolator valve 44. If power to the machine should be cut off during the brewing cycle, relay 126 remains locked in the energized position and the brewing cycle is completed when power is restored.

The machine is now dispensing coffee from container 55; contact 118g is closed so that dispensing valve 57 is utilized on actuation of the dispensing circuits. When fifteen cups of coffee have again been dispensed, totalizer relay 117 causes contact 117a to close and 117b to open, initiating another brewing operation.

The next brewing operation proceeds generally as before, however, the wheel 26 does not turn as switch 87a remains open at all times. At the start of the cycle of pressure arm motor 80, switch 88a opens breaking the energization circuit for selector relays 118 and 118' so that the contacts associated therewith return to the positions shown in the drawings. The dumping circuit is completed through contact 118f to open dumping valve 60 emptying any remaining coffee in container 55. Similarly the brewing circuit is completed through contact 118d and safety switch 133 (associated with pressure arm 34) opening percolator water valve 45. As the level of coffee rises in container 55 it contacts electrode 136 completing a circuit through contact 118b to energize brewing stop relay 135.

The machine includes a separate set of control elements associated with each of the coffee dispensing containers 52 and 55. These include the dispensing and dumping valves, percolator valves and measuring electrodes. Through the operation of selector relays 118 and 118', under the control of pressure arm cam 88, only the circuits of desired ones of these elements are rendered operative at any given time.

A double-throw percolator empty switch 123 is actuated after coffee has been prepared in the last pair of percolators opening contact 123a and closing contact 123b. Contact 123a is in the safety power circuit and its opening prevents further operation of circuits energized therefrom. Contact 123b completes a circuit through lead q energizing "sold-out" light 123'. In the embodiment of the machine shown in Figures 2 and 6, there are a plurality of latches 127 carried on the outer surface of wheel flange 26c. The serviceman, after replacing used percolators, throws the latch 127 on the right of the brewing station to the broken line position (Figure 6). When wheel 26 starts to turn at the beginning of a brewing cycle after the last percolator has been used, latch 127 strikes the operating arm 123c of the percolator empty switch opening contact 123a and closing 123b.

Should the cup supply be exhausted, cup empty switch 125 opens, breaking the energization circuit for coin reject magnet 114.

It has been found that the coffee, even though it is well filtered, will become bitter if permitted to stand in the heated dispensing tanks too long, as for eight or nine hours. Accordingly, a dumping system is provided for emptying stale coffee from the dispensing tanks and causing the preparation of fresh coffee, if fresh coffee has not been prepared for a predetermined period of time, as eight hours. A dumping timer motor 140 is energized from the safety power line through wire s, wire u and contact 140a of a switch associated therewith. The switch 140a, 140b is mechanically connected with dumping timer motor 140 through a magnetic clutch controlled by clutch coil 140'. The clutch coil is normally energized by a circuit from the safety power line through lead e, contact 121b of pressure arm relay 121, wire b, a timer 141 (which will be discussed later), contact 119b, wire d and contact 121c of the pressure arm relay. Whenever the machine rebrews as a result of depletion of the coffee in one or the other of the containers, the circuit for clutch coil 140' is broken by opening of one or more of the contacts in each circuit, during initiation of the brewing process. This resets the dumping timer after each fresh batch of coffee is prepared. Further details of the physical arrangement of timer motor 140, the switch associated therewith, the clutch and clutch coil 140' may be found in copending Arnett application, Serial No. 427,279, filed May 3, 1954, now Patent No. 2,830,528, issued on April 15, 1958.

Assuming that the machine has not prepared fresh coffee during the period for which dumping timer 140 is set, switch 140b is closed and 140a is opened. The closing of switch 140b completes a circuit from the safety power line through wires s and u, energizing dumping cycle timer motor 142. The initial movement of motor 142 turns cam 143 associated therewith closing switch 143a completing a secondary energization circuit for the motor. Cams 143 and 144 are driven by motor 142 at the rate of one revolution in six minutes while cam 145 is driven at the rate of one revolution in one minute. Switch 144a is closed during the first and the last minute of the cycle of motor 142. Thus, at some point during the first minute of operation switch 145a closes, and as switch 144c is still closed, a circuit is completed energizing relay 119. This initiates a brewing operation which proceeds in the same manner as previously described, even though the beverage dispensing containers may both be full. With percolators of the size used in the present machine, the brewing operation is completed in about four minutes, so that when switch 144a again closes during the last minute of the dumping cycle, the brewing cycle has been completed. Accordingly, as switch 145a closes during the last minute of the cycle, the energization circuit for relay 119 is again completed, the other dispensing tank is emptied and a second fresh batch of coffee prepared. When all of the percolators have been used, pressure arm motor 80 stops in mid cycle and relay 121 is kept energized, preventing the dumping circuits from draining the coffee remaining in the dispensing containers, regardless of how long it may stand there.

If for some reason it is desired to prepare fresh coffee at some other time, a manual switch 146 is provided which may be utilized to initiate the operation of dumping cycle timer 142.

On weekends or holidays it may be desired to control the operation of the dumping circuits so that coffee is not wasted. Accordingly a second timer 141 is placed in the circuit of clutch coil 140' and may be set to close this circuit after some predetermined period of time. For example, if the machine will not be used over a weekend and the dumping timer cycle is nine hours, timer 141 might be set on a Friday evening for a little over fifty hours. This timer would have then run its cycle shortly before midnight Sunday night permitting energization of dumping timer clutch coil 140'. Then at about eight o'clock Monday morning the dumping timer will have completed its cycle and fresh coffee will be prepared.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. Beverage brewing and dispensing apparatus of the character described, comprising: a pair of storage containers; means for brewing fresh beverage and directing it to said containers; means for dispensing beverage from said containers; a first circuit for controlling the brewing of fresh beverage and directing it to one of said containers and for controlling the dispensing of beverage from the other container; a second circuit for controlling the brewing of fresh beverage and directing it to the other container and for controlling the dispensing of beverage from said one container; and means responsive to the consumption of beverage from said containers for alternately utilizing said first and second circuits.

2. Beverage brewing and dispensing apparatus of the character described, comprising: a pair of storage containers; a plurality of beverage brewing receptacles each adapted to contain a quantity of beverage brewing particulate material, said receptacles being divided into two groups, one group associated with the first container and the other group associated with the second container; a source of brewing liquid; a brewing station; a pair of pressure connectors at said brewing station each connected to said source of liquid and one associated with each group of brewing receptacles; means for moving said receptacles to said brewing station; means for bringing said pressure connectors into sealed engagement with the brewing receptacles at said brewing station; a first circuit for controlling the provision of brewing liquid to one of said pressure connectors to supply fresh beverage to one of said containers and for controlling the dispensing of beverage from the other container; a second circuit for controlling the provision of brewing liquid to one of said pressure connectors to supply fresh beverage to the other container and for controlling the dispensing of beverage from said one container; and means for alternately utilizing said first and second circuits.

3. Beverage brewing and dispensing apparatus of the character described, comprising: a pair of storage containers; a plurality of beverage brewing receptacles each adapted to contain a quantity of beverage brewing particulate material, said receptacles being divided into two groups, one group associated with the first of said containers and the other group associated with the second of said containers; a source of brewing liquid; a brewing station; a pair of pressure connectors at said brewing station, each connected to said source of liquid and one associated with each group of brewing receptacles; means for moving said brewing receptacles to said brewing stations; operating means for bringing said pressure connectors alternately into operative sealed relation with a brewing receptacle of the associated group; a first circuit for controlling the provision of brewing liquid to one of said pressure connectors to supply fresh beverage to the first container and for controlling the dispensing of beverage from the second container; a second circuit for controlling the provision of brewing liquid to the other of said pressure connectors to supply fresh beverage to the second container and for controlling the dispensing of beverage from the first container; relay means for alternately selecting said first and second circuits; and cam means associated with said operating means for controlling said relay means.

4. Beverage brewing and dispensing apparatus of the character described, comprising: means for preparing fresh beverage; a container adapted to receive beverage from said preparing means; means, including a valve, for dispensing beverage from said container; a totalizer actuated by each operation of said dispensing means; means actuated by said totalizer for causing operation of said beverage preparing means after a predetermined number of actuations of said dispensing means; a timer for controlling the operation of said dispensing valve; and means responsive to said totalizer for varying the period of time said valve is open.

5. Beverage brewing and dispensing apparatus of the character described, comprising: means for brewing fresh beverage; a pair of beverage containers for receiving fresh beverage from said brewing means; means for dispensing beverage from each of said containers; means responsive to the consumption of beverage from said containers for causing the brewing of fresh beverage when the supply in said containers is depleted; and means independent of said consumption responsive means for causing the brewing of fresh beverage when it has not been prepared for a predetermined period of time, including means for emptying one of said containers, time delay means and means responsive to said time delay means for emptying the other of said containers.

6. Apparatus of the character described in claim 5, wherein said time delay means delays the emptying of the second container for a sufficient period of time to permit the preparation of fresh beverage for said first container.

7. A beverage handling system of the character described, including: means for storing a beverage; means for dispensing beverage from said storage means; means for brewing fresh beverage and directing it to said storage means; first timing means; means for initiating operation of said first timing means on operation of said beverage brewing means; means operable as a function of said first timing means to cause said system to brew a fresh batch of beverage after the elapse of a predetermined period of time from the initiation of operation of said timing means; means operable as a function of the operation of said brewing means for resetting said timing means when brewing occurs; and second timing means for disabling said first timing means for a predetermined period.

8. A system of the character described in claim 7, wherein said first timing means includes a magnetic clutch having an energization circuit, and said second timing means includes a switch in the energization circuit of said clutch.

9. Beverage brewing and dispensing apparatus of the character described, comprising: a cabinet housing said apparatus, said cabinet having a rear wall; an upright percolator support wheel having a back plate and rotatably mounted in said cabinet with said back plate adjacent said cabinet wall, said back plate having an opening therein; plurality of percolators carried on said support wheel and arranged about the periphery thereof; a brewing station in said machine, adjacent the top of said wheel; a source of brewing water including a pressure connector movably mounted at said brewing station; means for rotating said wheel to bring successive percolators to said brewing station; means for moving said pressure connectors into sealed engagement with a percolator at said brewing station and for introducing hot water to the percolator to brew beverage; a bracket secured to the rear wall of said cabinet and extending through the opening in the back plate of said wheel; a beverage storage tank carried by said bracket and positioned below the percolator at said brewing station; means for directing fresh brewed beverage from the percolator at said brewing station to said storage tank; means for dispensing beverage from said storage tank; and means operable as a function of the quantity of beverage in said storage tank for controlling rotation of said wheel, movement of the pressure connector and introduction of hot water to said percolator to provide fresh beverage to said storage tank as needed.

10. Beverage brewing and dispensing apparatus of the character described, comprising: a first and a second beverage storage container; beverage brewing means for automatically providing freshly prepared beverage for each of said storage containers, as needed; first control means, including electrical circuits, for controlling the dispensing of beverage from said first container while controlling the brewing of beverage to replenish the supply of beverage in the second container; second control means, including electrical circuits, for controlling the dispensing of beverage from said second container while controlling brewing of beverage to replenish the supply of beverage in said first container; and means, responsive to the consumption of beverage, for alternately utilizing said first and second control means, including means for alternately energizing the respective electrical circuits.

11. A beverage handling system of the character described, including: means for storing a beverage; means for dispensing beverage from said storage means; means for brewing fresh beverage and directing it to said storage means; means for measuring the consumption of beverage; means actuated by said beverage consumption measuring means for controlling the operation of said beverage brewing means; a first timer; means for initiating operation of said first timer; means operable as a function of said first timer to cause said brewing means to brew a fresh batch of beverage after the elapse of a predetermined period of time from the initiation of operation of said timer; and a manually operable second timer for disabling said first timer for a predetermined period.

12. In a beverage preparing machine, apparatus of the character described, comprising: a percolator support wheel including a plate mounted in said machine for rotation in a generally vertical plane; a series of rod-like percolator support members mounted around the periphery of the surface of said plate and extending outwardly therefrom; a plurality of percolators, each having a brewing liquid inlet and a brewed beverage outlet, slidably carried between adjacent support members; a brewing station in said machine, said support wheel being rotatable to bring said percolators into said brewing station; means at said brewing station for introducing brewing liquid into the inlet of the percolator thereat; and brewed beverage receiving means at said brewing station for receiving brewed beverage from the outlet of the percolator thereat.

13. Apparatus of the character described in claim 12, including a spring means associated with said support members for securing said percolators to said plate.

14. A beverage brewing apparatus of the character described: comprising: a plurality of beverage brewing receptacles each adapted to contain a quantity of a particulate beverage ingredient; a brewing station in said apparatus; means, including a motor, for moving said brewing receptacles successively into position at said brewing station; a source of brewing liquid under pressure; a pressure connector connected to said source of brewing liquid and movable toward and away from a brewing receptacle at said brewing station; a valve associated with said source of liquid and controlling the flow of liquid to said pressure connector; a control motor; cam means driven by said control motor for effecting movement of said pressure connector toward and away from the brewing receptacle at said brewing station; a circuit for energizing the receptacle moving motor and including a cam switch associated with said motor driven cam means, and closed when said pressure connector is moved away from the brewing receptacle at said brewing station; a circuit for energizing said valve and including a cam switch associated with said motor driven cam means, and closed when said connector is moved into engagement with the brewing receptacle at said brewing station; a dispensing container for receiving brewed beverage from the receptacle at said brewing station; means for dispensing beverage therefrom; means for measuring the consumption of beverage; and means responsive to said consumption measuring means for effecting operation of said control motor.

15. Beverage brewing apparatus of the character described in claim 14, wherein said pressure connector is carried on a pivotally mounted arm, and said first cam means effects movement of said arm about said pivot to move said pressure connector toward and away from said brewing receptacle.

16. Beverage brewing and dispensing apparatus of the character described, comprising: means for brewing a fresh beverage including a valve for brewing liquid; a container to receive beverage from said brewing means; means for dispensing beverage from said container; means for measuring the consumption of beverage from said container; means for initiating the operation of said fresh beverage brewing means, responsive to said beverage consumption measuring means; a valve for draining said container; means, responsive to said brewing operation initiating means for opening said drain valve for a period, to empty said container prior to the introduction thereto of fresh beverage, and for closing said drain valve at the end of the period; and means responsive to said brewing operation initiating means for opening said brewing liquid valve after said drain valve closes.

(References on following page)

References Cited in the file of this patent

UNITED STATES PATENTS

| | | |
|---|---|---|
| 1,390,008 | Arduino | Sept. 6, 1921 |
| 1,467,778 | Paola | Sept. 11, 1923 |
| 1,513,685 | Ardovino | Oct. 28, 1924 |
| 1,621,620 | Bast | Mar. 22, 1927 |
| 1,805,159 | Bauer et al. | May 12, 1931 |
| 1,822,433 | Brand | Sept. 8, 1931 |
| 2,013,172 | Petrone | Sept. 3, 1935 |
| 2,014,325 | Grilli | Sept. 10, 1935 |
| 2,283,967 | Brown | May 26, 1942 |
| 2,315,777 | Denton | Apr. 6, 1943 |
| 2,360,194 | Bright | Oct. 10, 1944 |
| 2,372,448 | Porteous | Mar. 27, 1945 |
| 2,407,453 | Rougier | Sept. 10, 1946 |
| 2,517,073 | Alvarez | Aug. 1, 1950 |
| 2,529,395 | Hummel | Nov. 7, 1950 |
| 2,544,836 | Hotvedt | Mar. 13, 1951 |
| 2,592,761 | Svendsgaard | Apr. 15, 1952 |
| 2,622,766 | Simon | Dec. 23, 1952 |
| 2,667,990 | Mojonnier | Feb. 2, 1954 |
| 2,712,887 | King | July 12, 1955 |
| 2,718,843 | Jones | Sept. 27, 1955 |
| 2,734,658 | Poitras | Feb. 14, 1956 |
| 2,830,142 | Smith | Apr. 8, 1958 |
| 2,830,528 | Arnett | Apr. 15, 1958 |

FOREIGN PATENTS

| | | |
|---|---|---|
| 457,264 | France | July 8, 1913 |
| 258,139 | Italy | Apr. 25, 1927 |